H. T. HUGHES.
NUT LOCK.
APPLICATION FILED FEB. 25, 1913.
1,081,232.
Patented Dec. 9, 1913.
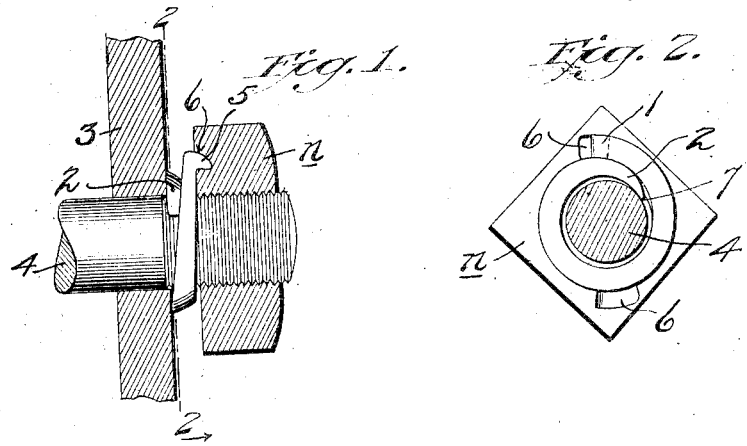
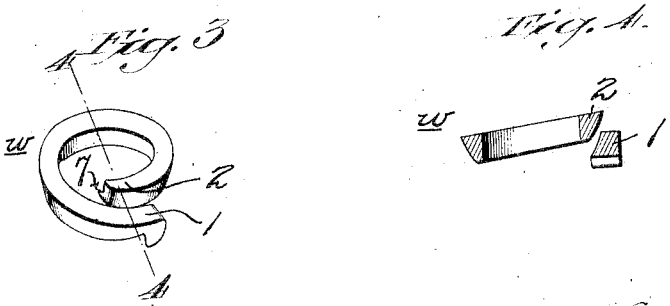
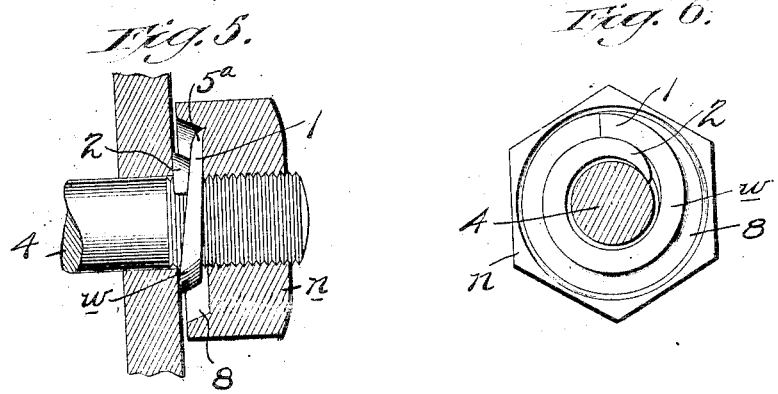
Witnesses
Inventor
Hugh T. Hughes
By W. C. Carman
Attorney

UNITED STATES PATENT OFFICE.

HUGH T. HUGHES, OF YOUNGSTOWN, OHIO, ASSIGNOR OF ONE-HALF TO W. H. McGRANAGHAN, OF YOUNGSTOWN, OHIO.

NUT-LOCK.

1,081,232.  Specification of Letters Patent.  Patented Dec. 9, 1913.

Application filed February 25, 1913. Serial No. 750,673.

*To all whom it may concern:*

Be it known that I, HUGH T. HUGHES, a citizen of the United States, residing at Youngstown, in the county of Mahoning and State of Ohio, have invented certain new and useful Improvements in Nut-Locks, of which the following is a specification.

This invention relates to the subject of nut locking devices, and more particularly of the type wherein a locking washer is interposed between the inner face of the nut and the abutment through which the bolt extends.

To this end, the invention has in view a simple and inexpensive form of nut lock of such construction as to render the same easy of application, while at the same time providing secure and effective means for locking the nut to the bolt so as to prevent loosening or unscrewing of the nut when subjected to heavy vibrations or other conditions that usually loosen nuts upon their bolts.

A further object of the invention is to provide a nut locking device which may be constructed from a single strip of spring steel or equivalent material, and to shape this strip into a form of washer possessing sufficient strength and durability for the purpose intended, and also embodying means whereby, under the application of pressure, one terminal of the said washer will be held firmly interlocked or engaged with the nut at the inner side thereof, while the other terminal of the washer will be tightly wedged into binding engagement with the threads of the bolt. In this connection, it is also proposed that not only the free terminal of the washer or washer-ring shall be wedged in binding or locking engagement with the locking threads, but also that the washer-ring as an entirety shall be compressed or constricted upon the tops of the bolt threads, thus providing a most effectual and secure lock for the nut that will enable it to resist all ordinary tendencies for loosening or unscrewing.

With these and other objects in view which are usually sought to be accomplished with a device of this character, the invention consists in the novel construction of a split washer-ring and its mode of application, hereinafter more particularly described, illustrated and claimed.

In the accompanying drawings showing the preferred embodiments of the invention,—Figure 1 is a sectional elevation illustrating the application of the improved nut locking device, but not showing the nut screwed home. Fig. 2 is an enlarged sectional view on the line 2—2 of Fig. 1, exposing the washer-ring arranged at the inner face of the nut and engaged with the bolt. Fig. 3 is a detail view in perspective of the improved form of the washer-ring. Fig. 4 is a detail cross sectional view, on the line 4—4 of Fig. 3, showing the characteristics of the washer-ring at different points. Figs. 5 and 6 are views similar to Figs. 1 and 2 respectively illustrating a modification of the invention wherein the washer-ring is received within a tapered recess.

Like reference characters designate corresponding parts in the several figures of the drawings.

As herein indicated, the improved nut locking device constituting the present invention primarily consists of what may be termed a spirally coiled spring split washer-ring, designated in its entirety by the reference letter $w$. This washer-ring is made from a single strip of spring steel or equivalent material, and is spirally coiled for the purpose of bringing its two terminals 1 and 2, respectively, not only into overlapping relation, but also into telescopic relation. That is to say, the coiling of the washer strip into split ring form brings the said two terminals into overlapping arrangement, as plainly shown in Figs. 2 and 3 of the drawings, while the spiral effect that is given to the coiling normally brings the ring terminals 1 and 2 into different planes, so that they may telescope one within the other upon the application of pressure due to the screwing home of the nut.

In the usual application of the invention, the spirally coiled washer-ring $w$ is interposed between the inner face of the nut and the fixed abutment 3 through which the bolt 4 extends, and at what may be termed its fixed terminal, the washer-ring is provided with a laterally offset holding stud 5 that engages a keeper socket 6 at the inner side of the nut. The other terminal 2 of the washer-ring telescopically wedges within and against the fixed terminal 1. The wedging action is caused by reason of the fact that the telescoping portions of the ring have opposing wedge faces due to the structural characteristic of having the washer-ring cross sectionally tapered. Also it is preferable that the ring is tapered in the direction of its length toward the free locking terminal 2. Accordingly, when the nut is screwed tight, with the terminal 1 locked to the nut at 6, the entire washer is compressed upon the bolt threads, and at the same time the free terminal or tongue 2 is telescoped into the fixed terminal 1 with the added effect of causing said terminal tongue to crowd with a binding and thread distorting pressure upon the bolt threads. Also in this connection, it is preferable to provide the inner extremity of the free locking terminal 2 with an inwardly projecting biting point or tooth 7 which trails in the valleys of the bolt threads, and also has a biting engagement therein.

Another adaptation and form of the invention is suggested in Figs. 5 and 6 of the drawings, wherein the washer-ring is adapted to be received within a tapered recess 8 within the inner face of the nut, and instead of a specially formed holding stud 5, the fixed terminal 1 of the ring may be shaped to present a corner point 5ᵃ that bites the nut at the bottom of the recess 8 to secure the locking engagement between the nut and the said washer-ring.

From the foregoing, it is thought that the construction, operation, and many advantages of the herein described improvement in nut locks will be readily apparent without further description.

I claim:

1. A nut lock, comprising in combination with the nut and the bolt, a spring split washer-ring arranged at the inner side of the nut and having wedging terminals one within the other which respectively have a locking engagement with the nut and bolt upon application of pressure.

2. A nut lock, comprising in combination with the nut and the bolt, a spring split washer-ring tapered in cross section and also in the direction of one terminal, the latter terminal having a wedging fit within the other terminal.

3. A nut lock, comprising in combination with the nut and the bolt, a spring split washer-ring tapered in cross section and also in the direction of one terminal, the latter terminal having a bolt thread-engaging point and also having a wedging engagement within the other terminal.

4. A nut lock, comprising in combination with the nut and the bolt, a spring split washer-ring arranged at the inner side of the nut and tapered in cross section and also in the direction of one terminal, the latter terminal having a wedging engagement with the other terminal, and said other terminal having a stud for engagement with the nut.

5. A nut lock, comprising in combination with the nut and the bolt, a spirally coiled spring split washer-ring having one end engaged with the nut and a free terminal locking tongue fitting within the other end portion, said end portions of the ring having opposing wedging faces that crowd the tongue onto and into the bolt threads upon application of pressure.

In testimony whereof I hereunto affix my signature in the presence of two witnesses.

HUGH T. HUGHES.

Witnesses:
 E. E. MILLER,
 AGNES A. JOHNSTON.